(12) United States Patent
Salles et al.

(10) Patent No.: US 9,849,767 B2
(45) Date of Patent: Dec. 26, 2017

(54) SEAL FOR A DOOR, DOOR AND VEHICLE FITTED WITH SAME

(71) Applicant: Faiveley Transport Tours, Saint Pierre des Corps (FR)

(72) Inventors: Olivier Salles, Lecousse (FR); Damien Morand, Tours (FR); Thierry Montanie, Tours (FR)

(73) Assignee: Faiveley Transport Tours, Saint-Pierre-des-Corps (FR)

( * ) Notice: Subject to any disclaimer, the term of this patent is extended or adjusted under 35 U.S.C. 154(b) by 0 days.

(21) Appl. No.: 14/900,256

(22) PCT Filed: Jun. 19, 2014

(86) PCT No.: PCT/FR2014/051528
§ 371 (c)(1),
(2) Date: Dec. 21, 2015

(87) PCT Pub. No.: WO2015/004356
PCT Pub. Date: Jan. 15, 2015

(65) Prior Publication Data
US 2016/0144699 A1 May 26, 2016

(30) Foreign Application Priority Data

Jul. 8, 2013 (FR) .................................. 13 56712

(51) Int. Cl.
*B60J 10/40* (2016.01)
*E05F 15/42* (2015.01)
(Continued)

(52) U.S. Cl.
CPC .............. *B60J 10/40* (2016.02); *B60J 10/80* (2016.02); *E05F 15/42* (2015.01); *E06B 7/16* (2013.01); *E05Y 2900/51* (2013.01)

(58) Field of Classification Search
CPC ... B60J 10/40; B60J 10/80; E06B 7/16; E05F 15/42
(Continued)

(56) References Cited

U.S. PATENT DOCUMENTS 5,433,031 A * 7/1995 Dailey .................... E05F 15/40
49/27
6,125,591 A * 10/2000 Schmidhuber ........ E06B 7/2318
49/26
(Continued)

FOREIGN PATENT DOCUMENTS

CH 688354 8/1997
DE 20 2006 010582 U1 10/2006
(Continued)

OTHER PUBLICATIONS

International Search Report dated Jul. 25, 2014 out of corresponding priority Application No. PCT/FR2014/051528 (6 pages).
(Continued)

*Primary Examiner* — Katherine Mitchell
*Assistant Examiner* — Marcus Menezes
(74) *Attorney, Agent, or Firm* — Brinks Gilson & Lione; G. Peter Nichols (57) ABSTRACT

The invention relates to a seal including a body having a built-in chamber in which a switching element is arranged, and a lever for actuating the switching element. The lever can tilt relative to the body in two different directions. The range of movement and shape of the lever and/or the arrangement thereof relative to a wall of the chamber are such that the tilting of the lever, in a first of the different directions, does not deform the chamber, or does not deform same enough for the switching element to switch, and such that the tilting of the lever in the second direction deforms the chamber so that the switching element switches.

8 Claims, 5 Drawing Sheets

(51) Int. Cl.
*B60J 10/80* (2016.01)
*E06B 7/16* (2006.01)

(58) Field of Classification Search
USPC .................................................. 49/27, 26
See application file for complete search history.

(56) References Cited

U.S. PATENT DOCUMENTS

| | | | | |
|---|---|---|---|---|
| 6,233,872 | B1* | 5/2001 | Glagow | E05F 15/443 |
| | | | | 49/27 |
| 7,603,813 | B2* | 10/2009 | Hackl | E05F 15/42 |
| | | | | 49/120 |
| 8,061,084 | B2* | 11/2011 | Katzensteiner | B60J 10/0091 |
| | | | | 49/27 |
| 8,898,956 | B2* | 12/2014 | Nam | E05F 15/0078 |
| | | | | 49/26 |
| 2005/0117270 | A1* | 6/2005 | Scherraus | B60J 5/101 |
| | | | | 361/302 |
| 2011/0011004 | A1* | 1/2011 | Courrian | B61D 19/026 |
| | | | | 49/483.1 |
| 2015/0082705 | A1* | 3/2015 | Kaczmarczyk | E06B 7/2309 |
| | | | | 49/368 |
| 2016/0137043 | A1* | 5/2016 | Baba | B60J 10/277 |
| | | | | 49/483.1 |
| 2016/0144699 | A1* | 5/2016 | Salles | B60J 10/40 |
| | | | | 49/483.1 |

FOREIGN PATENT DOCUMENTS

| | | | | |
|---|---|---|---|---|
| DE | 10 2009 041735 | | 4/2010 | |
| EP | 1 561 623 | | 8/2005 | |
| EP | 2330271 B9 | * | 7/2015 | ........... E06B 7/2312 |

OTHER PUBLICATIONS

Written Opinion dated Jul. 25, 2014 out of corresponding priority Application No. PCT/FR2014/051528 (5 pages).

* cited by examiner

SEAL FOR A DOOR, DOOR AND VEHICLE FITTED WITH SAME

This application claims priority to International Application No. PCT/FR2014/051528 filed Jun. 19, 2014, and to French Application No. 1356712 filed Jul. 8, 2013; the entire contents of each are incorporated herein by reference.

This relates to a front male seal for a door, a door of a vehicle passenger compartment and such a vehicle, of the railway type.

BACKGROUND

In DE 102009041735, such a seal is disclosed, comprising:
- a seal body integrating a chamber:
  - a wall of which projects into a space,
  - and in which a switching-over element that switches over by deforming the chamber is disposed,
  - and a lever for actuating the switching-over element, the lever tilting with respect to the body, including the chamber, in two different directions, and comprising:
    - on a side facing said space, a surface suitable for acting on the wall of the chamber during tilting, and
    - on an opposite side, a protuberance which, under the action of an external activation element, rocks the lever.

The switching-over element (or member sensitive to pressure) may, for example, be an electrical sensitive strip, an optical fibre, a column of air, etc.

Typically, the objective is then to have a seal, in particular for a train, metro, tram, etc. equipped with a sensitive element or switching-over element, which fulfils the anti-drag function.

The anti-drag function makes it possible in particular to prevent persons situated on a platform where the rail vehicle is passing and wedged by the closure of the doors (via a garment, a bag strap, etc.) being pulled by the vehicle. This type of dragging may in fact injure or even cause the death of the person. An object (or what can be termed generically "an external actuation element") capable of acting on the lever in order to switch over the switching-over element and which is wedged in the seal, typically with the door closed, outside, may also be dragged by the moving vehicle, from the inside of the vehicle.

One problem is that these safety measures degrade the availability of the vehicles in question, because of the frequent re-opening of the doors (after normal closures), departures of delayed trains, etc.

SUMMARY

One solution proposed for reconciling safety of persons and better availability of vehicles consists of the mobility and conformation of the lever and/or its relative arrangement with respect to the wall of the chamber of the seal presented above being such that the tilting of the lever:
- in a first of its tilting directions, does not deform said chamber, or insufficiently for the switching-over element to switch over,
- and, in the second direction, deforms said chamber so that the switching-over element switches over.

Thus the safety of travellers is not compromised, but excessively easy activation of the anti-drag system from the inside of the vehicle can be prevented.

Such an anti-drag system can remain sensitive for persons or objects wedged in the door and who might be dragged from the outside of the vehicle (real danger). On the other hand, it can be little or not at all sensitive for objects wedged in the door and which would be dragged from the inside. In the latter case, it may be a case of persons who are already in the vehicle and then do not run the risk of being dragged/pulled by this vehicle.

For the guidance and mechanical strength of the lever, it is moreover advisable that it be mounted so as to tilt vis-à-vis the body of the seal by means of a hinge strip situated alongside the chamber.

In order, according to another aspect, which may be complementary to the above, to differentiate and/or favour the tilting of the lever in a direction thereof in the opposite direction, it is recommended that, unlike the articulation of the lever on the body, said lever be connected to said body by a strip of material, so that the aforementioned space where the wall of the chamber of the seal projects is closed.

In order, according to yet another aspect, which may be complementary to those above, to assist the operational efficacy and the security of actuation of the switching-over element, it is recommended that the seal body has two lateral bearing surfaces:
- preferably planar and perpendicular to the principal axis of the seal passing through the lever, said chamber, the switching element that is situated therein and a connecting piece for fixing the seal to a support (such as the door structure or an open edge of the vehicle body),
- and situated respectively on either side of the lever and the chamber, and against at least one of which there can bear said external actuation element able to act on the lever in order, in said second direction, to make the switching-over element switch over.

A solution with a single lateral bearing surface, preferably situated opposite the articulation/tilting of the lever on the body, is also possible.

Again to assist the differentiation of actuation in one direction and in an opposite direction of the lever, it is also advisable that, between the location where the lever is articulated on the body and the lateral bearing surface that is closest, the body of the seal is solid and devoid of any chamber liable to be deformed by the lever and therefore thus to make the switching-over element switch over when the lever tilts in the first direction.

To make the front male seal presented above favourably operational, it is moreover recommended to produce a set of seals comprising:
- this male seal, and
- a front female seal having a hollow where the protuberance extends and where it is able to move in said directions.

Concerning the passenger compartment door of the vehicle, it is advisable:
- for the passenger compartment to have an internal side where the passengers are received in the passenger compartment and an external side:
- and that the door be:
  - able to move between respectively open and closed positions which, respectively, allow and prevent access beyond this door, to the inside, in the passenger compartment and to the outside,
  - provided with the aforementioned front male seal, with all or some of its features, as above for the assembly presented,
  - and has an edge along which the front male seal will extend which, in the closed position, will thus engage in a hollow of a front female seal.

On this door, again to guide and assist the tilting in one direction, it is moreover advisable for the lever to be mounted so as to be able to tilt vis-à-vis the body in a region situated closer to the inside of the passenger compartment than is said surface that acts on the wall of the chamber, so that the external actuation element, retained on the inside and pulled on the outside after having passed between the lever and the bottom of said hollow, tilts the lever towards the switching-over element.

Concerning now the vehicle, it is recommended that it comprises:
a body surrounding a passenger compartment having an inside where passengers are received in the passenger compartment and an outside, the body having at least one opening for accessing the passenger compartment and leaving same, and
a door able to move between respectively open and closed positions and which, respectively, allow and prevent passage through the opening,
the body and the door receiving, fixed to them along respective edges that may face each other, in one case the front male seal according to all or some of its features, the other a front female seal having a hollow where at least the lever of the male seal engages, in the closed position of the door.

Other features and/or details relating to the above are also provided below, with reference to the accompanying drawings, where at least one embodiment is illustrated, in particular of a said male seal, by way of preferred example.

BRIEF DESCRIPTION OF THE DRAWINGS

In these drawings.

DETAILED DESCRIPTION

These figures present a front male seal 1.
It is a front seal, in that it may be fixed along a front edge (rising upwards) 3a of a door 3 or of a body 30 of a vehicle of the rail type, as shown schematically in FIG. 4.
The vehicle 300 is preferably a rail vehicle in that it travels on at least one rail, with or without tyres. It may in particular be a metro, a train, or a tram.
The seal 1 is a seal for a door, in that it may be fixed to the door 3, or be fixed to the body 30, along an edge 31 of an opening 32 provided through a wall 33 of this body.

Figure 3:
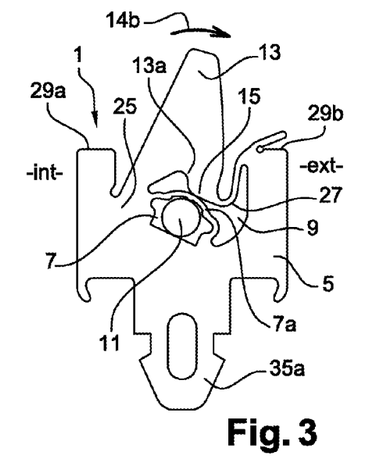
FIG. 3 shows the male seal tilted so that it activates the switching-over element.
Figure 4:
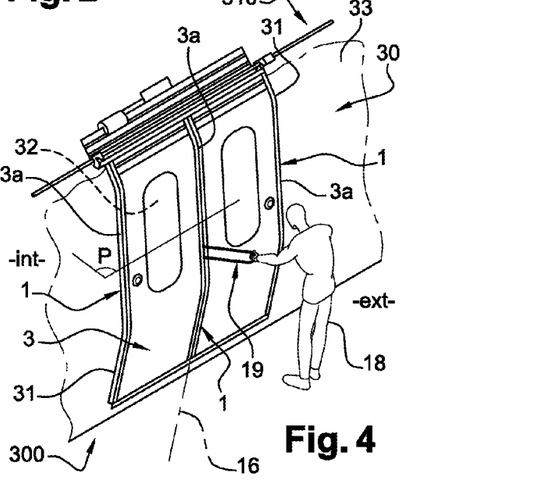
FIG. 4 shows schematically a car with two sliding (closed) doors and one or more sets of such seals.
Figure 5:
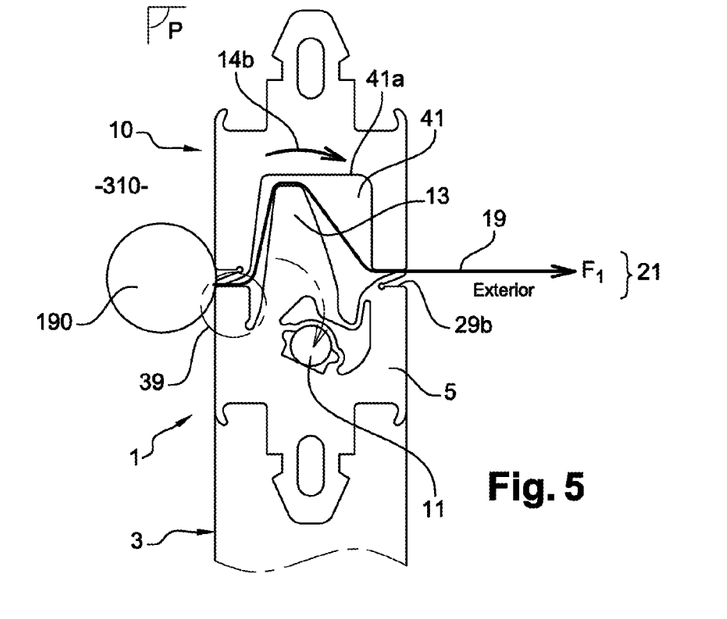
FIGS. 5, 6 show schematically actuations of the male seal leading respectively to an activation and a non-activation of the switching element cutting plane P),
FIGS. 7, 8, 9 on the one hand and 10, 11, 12 on the other hand correspond, for each group, to FIGS. 1, 5, 6, according respectively to second and third embodiments,
and FIG. 13 corresponds to another embodiment.

Typically, the opening 32 will define an access passage inside a compartment of a car of the vehicle 300, and/or exit therefrom.
And it is a male seal in that it comprises, FIGS. 1-3, 5-6, a projecting element for actuating the switching-over element 11, here the lever 13, or the protrusion 45 in FIGS. 7 to 12.
In both cases, it is advisable for it to cooperate with a female seal 10 fixed, according to circumstances, to the body 30 or to the door 3.
The seal 10 is female in that it has a hollow 41 where, in the closed position of the door 3, part of the male seal 1 engages, typically the lever 13, or the protrusion 45.
The male seal 1 comprises:
a seal body 5 integrating a chamber 7:
a wall 7a of which projects into a space 9,
and in which a switching-over element 11 (or a pressure-sensitive member) is disposed, which switches by deformation of the chamber,
and a lever 13 for actuating the switching-over element 11 (version in FIGS. 1-3, 5-6).
The switching-over element 11 may be an electrical sensitive strip, an optical fibre, a column of air, a piezoelectric element, etc.
It is important to note that the lever 13 is not a sealing lip, unlike the tilting lip 50 in the publications EP1561623 and DE202004014861.
The lever 13 can tilt with respect to the body 5, including the chamber 7, in two different directions.
In the preferred version illustrated, these two directions, respectively 14a, 14b (FIGS. 3, 5, 6), defining a possibility of rotation or articulation in the same plane containing the switching element 11 and perpendicular to the axis 16 along which the seal 1 extends along the body 30 (wall 33) or the door 3; cf. FIGS. 1, 4, 6.
The lever 13 comprises:
on a side 13a facing the space 9, a surface 15 suitable for acting on the wall 7a of the chamber during tilting, and
on the opposite side 13b, a protuberance 17 which, under the action of an external actuation element 19, tilts the lever 13.
Typically, the external actuation element 19 may, as illustrated, be a bag strap 190, the bag being situated inside the body 30 of the vehicle which, typically, may define a metro, train, tram etc. passenger compartment that is travelling, whereas this strap projects out of the vehicle (out of the door), through the inter-seal space 21 (between the respectively male 1 and female 10 seals), with the door 3 closed.
In FIG. 4, this internal space (the inside of the space surrounded by the body 30) is referenced "int". The outside is referenced "ext". See also FIGS. 3 and 7-12, as well as the mentions "to the outside" in FIGS. 5, 6. The space surrounded by the body 30 may define a passenger compartment 310 inside which passengers are received (see FIG. 2 in particular).
In order to provide the anti-drag function (in particular avoiding the moving vehicle dragging in particular a person 18 situated outside the vehicle (FIG. 4)—typically here the body 30—with the element 19—the bag strap in the example—wedged in the vehicle, for example in the inter-seal space 21, while allowing good availability of the vehicles (avoiding their being excessively blocked in their travel), provision is made here for the mobility and conformation of the lever 13 and/or its relative arrangement with respect to the wall 7a of the chamber 7 of the seal presented above to be such that the tilting of the lever:

in the first direction 14*a* of its tilting directions, does not deform said chamber, or insufficiently for the switching-over element 11 to switch over (FIG. 6), and, in the second direction 14*b*, deforms said chamber so that the switching-over element 11 switches over (FIGS. 3, 5).

The first direction 14*a* goes from outside to inside, the second direction 14*b* goes from inside to outside.

Figure 6:
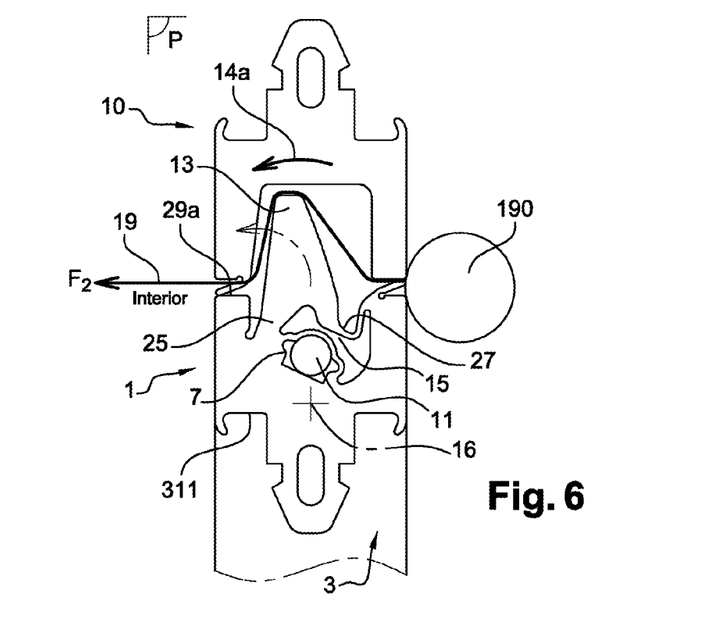

If, therefore, the element 19 in place as in FIGS. 5, 6 is pulled:

from inside to outside, the lever 13 will tilt in the second direction 14*b* and, under its actuation (its abutment against the wall 7*a*), the switching-over element 11 switches over (cf. FIG. 5 and then 3), from outside to inside, the lever 13 is actuated in the direction 14*a*, which tilts it in a direction such that it cannot actuate the switching-over element 11 or which does not make it tilt, or insufficiently so, to sufficiently actuate the switching-over element 11. The switching-over element 11 then does not switch over (cf. FIG. 6).

In place as in FIGS. 5, 6, the element 19 (such as a strap) is wedged on one side by the unit 190 (such as a bag) and passes on the opposite side, via the space 21, along first of all one of the lateral surfaces (such as 29*a*) and then around the lever 13 (on which it bears if pulled in the direction of F1 or F2), and then along the other one of the lateral surfaces (such as 29*b*). The traction forces F1, F2 are transverse to the axes 16 and 100. The lever 13 extends in the hollow 41 beyond the level of the lateral surfaces 29*a*, 29*b*.

The lever 13 is mounted so as to tilt vis-à-vis the body 5 of the seal by a hinge strip 25 situated alongside the chamber 7, FIGS. 3, 6.

The articulation on the body of the lever, here the hinge strip 25, is situated closer to the inside of the body 30 than to the outside.

Figure 2:
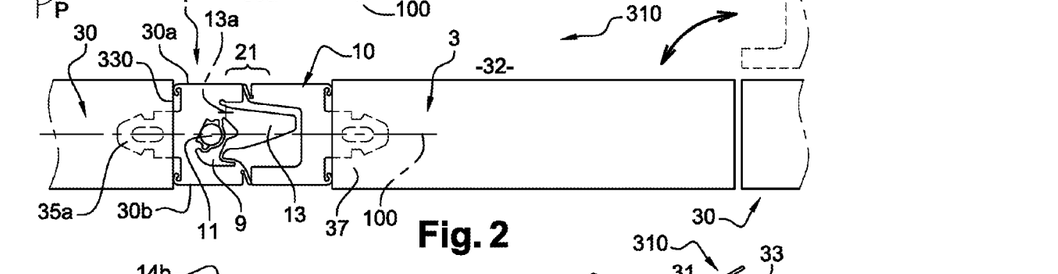
FIG. 2 shows, in cross-section, this assembly mounted on (and between) a sliding door and a body, along a cutting plane P marked in FIG. 4, on the assumption that the two doors illustrated in FIG. 4 have been replaced by a single one, opening and closing by a horizontal movement (sliding or swinging/sliding), as illustrated and described below, it being stated that, in FIG. 1, the lever has no band of material (27 hereinafter) for connection to the body of the seal.

This articulation, or tilting, takes place substantially about a virtual tilting axis 13*a* substantially parallel to the sides respectively interior 30*a* and exterior 30*b*, themselves substantially parallel to each other; FIG. 2.

In order, according to another aspect, which may be complementary to the above, to differentiate and/or assist the tilting of the lever in a direction (14*b* above) with respect to the one in the opposite direction, it is possible to make provision, opposite to the articulation of the lever on the body 5, for said lever to be connected to the body 5 by a strip 27 of material, so that the space 9 where the wall 7*a* of the chamber of the seal projects is closed; see FIG. 3.

Figure 1:
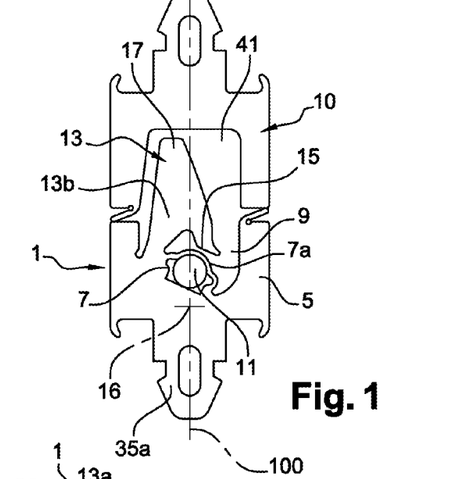
FIG. 1 shows a set of male and female seals in plan view; the male seal is at rest.

It should be noted however that this strip of material 27 could be dispensed with, as shown in FIG. 1, in order to make the tilting more sensitive. The absence of the strip of material (beyond the surface 15) may facilitate the choice of the form of the surface 15, on such an asymmetric seal geometry.

In order in particular to promote the operational efficacy and security of actuation of the switching-over element 11, it can be seen in the figures (except for FIG. 4) that the body 5 of the seal has two lateral bearing surfaces 29*a*, 29*b*.

As shown schematically in FIGS. 1, 2, 3 considered together, these surfaces are each preferably planar and perpendicular to the principal axis 100 of the seal passing through the lever 13, the chamber 9, the switching-over element 11 that is situated therein and a connecting piece 35*a* for fixing the seal to a support (such as the structure 37 of the door 3, or an edge of the body 30 of the vehicle). The connecting piece 35*a* may typically be fixed by forcible elastic engagement in a groove.

The lateral bearing surfaces 29*a*, 29*b* are situated respectively on either side of the lever 13 and chamber 9.

They are conformed and situated so that the actuation element 19 can bear against at least one of them in order then to act on the lever 13.

As already mentioned, it may be useful, in order to assist the differentiation of actuation in one direction and in the opposite direction of the lever 13, for, between the point where the lever is articulated on the body (zone 25 above) and the closest lateral bearing surface 29*a* (and therefore in the zone 39 in FIG. 5), the body of the seal to be solid and devoid of any chamber able to be deformed by the lever and therefore thus to make the switching-over element switch over when the lever is tilted in the first direction.

In order to make the male seal 1 operational, provision has been made for associating a female seal 10 with it.

The male seal 1 and female seal 10 assembly will favourably be such that the female seal will have a hollow (FIGS. 1, 5) where the protuberance 17 will extend and where therefore the lever 13 will be able to move in said directions 14*a*, 14*b*.

Concerning the door 3 of the passenger compartment of the vehicle 300, provision is favourably made for it:

to be able to move between respectively open and closed positions which, respectively, allow and prevent access beyond this door, to the inside, in the passenger compartment 310, to the outside, to be provided with the male seal 1, and to have an edge 311 along which the front male seal will extend, which, in the closed position of the door, will then engage in the hollow 41 of the front female seal 10, as shown schematically in FIGS. 5, 6.

In FIG. 2, the door 3 is shown in its respectively closed (between the two parts illustrated of the body 30 and aligned with them here) and open (to the right, offset) positions, it being stated that in this figure it is the door 3 that is equipped with the female seal 10 and the body 3 with the male seal 1. In this figure, the door has for convenience been shown, open, from the inside of the car. Typically, open, it will however preferentially be on the outside of the car (of the body).

On the door 3, again to guide and assist the tilting in one direction, it is moreover advisable, having regard to what was indicated above, for the lever 13 to be (as illustrated in FIGS. 5, 6) mounted so as to be able to tilt vis-à-vis the body 5 in a zone situated closer to the inside of the passenger compartment 310 than is the surface 15 that acts on the wall 7*a* of the chamber 7, so that the actuation element 19, retained on the inside (unit 190), emerging through 21 and pulled on the outside (force F in FIG. 5) after having passed between the lever and bottom 41*a* of the hollow 41, tilts the lever 13 towards the switching-over element 11.

Concerning now the vehicle 300 overall, it is recommended that it comprises, having regard once again to the above:

the body 30 surrounding the passenger compartment 310 and having the opening 32 here making it possible to access the passenger compartment and to leave it, and the door 30 therefore able to move between its open and closed positions which, respectively allows and prevents passage through the opening.

The body and the door receive, fixed to them along respective edges that may face each other (330 FIG. 2, 311 FIG. 6, for one of these edges according to two assemblies):

one the front male seal 1, the other the female seal 10 cooperating, the latter therefore having the hollow 41 where the lever 13 of the male seal must engage, in the closed position of the door.

Figure 7:
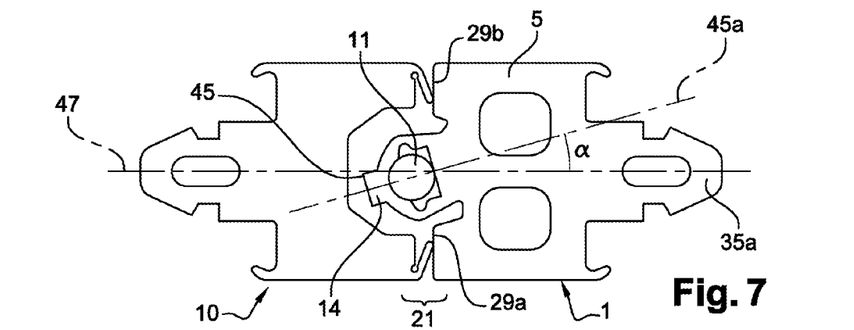

In FIG. 7 et seq, there are once again a male seal 1 and a female seal 10.

The front male seal 1 for a door comprises the seal body 5 that is extended:

on one side, by the connecting piece 35 for fixing to a support (such as the movable door 3 or the body 30), and on an opposite side, by a protrusion 45 housing the chamber 7 in which there is disposed the switching-over element (or a member sensitive to pressure/sensor) 11 that switches over by deformation of the chamber.

The body 5 has a principal axis 47 (FIG. 7) passing substantially through the chamber 7 and the fixing connecting piece 35a. It is provided with two lateral bearing surfaces 29a, 29b situated respectively on either side of the protrusion 45 and of the chamber, and against at least one of which the external actuation element 19/190 can bear, as before, namely:

passing from one side (inside/outside) to the other of the seal, subjected to traction (F1, F2) from one of these sides, and able to act on a free end (45a) of the protrusion in order to switch over the switching-over element 11 by bearing against said end.

The protrusion 45 has a central activation axis passing through said free end, characterised in that the central activation axis 45a (FIG. 7) extends aslant with respect to the principal axis 47 of the body, so that this central activation axis is naturally inclined more towards one of the lateral bearing surfaces than towards the other.

In FIG. 7 et seq concerned, the central activation axis 45a is thus naturally inclined more towards the lateral bearing surface 29a (the inside of the seal placed towards the passenger compartment 310) than towards the other 29b (the outside).

The free end 451 of the protrusion 45 has a planar bearing surface 450 for the actuation element 19, this planar surface extending aslant with respect to the principal axis 47 of the body and perpendicular to the central activation axis 45a passing through said free end.

As above, a vehicle is also then involved, comprising:

a body surrounding a passenger compartment having an inside where passengers are received in the passenger compartment and an outside, the body having at least one opening for accessing the passenger compartment and leaving it, and a door able to move between respectively open and closed positions which, respectively, allow and prevent passage through the opening, the body of the door receiving, fixed to them along respective edges that may face each other, one the aforementioned male seal, the other a front female seal having a hollow where at least the protrusion of the male seal engages, in the closed position of the door.

It should be noted that, preferably, on one side, between the protrusion 45 and one of the two lateral bearing surfaces 29a, 29b, the body 5 will have an easing slot 49 favouring the inclination of the protrusion in one direction (here towards the inside, on the same side as the passenger compartment 310 of the body).

As before the seal 1 cooperates with a female seal 10. Its protrusion 45 thus extends naturally in the hollow 41 of this female seal.

The principle of the solutions in FIG. 7 et seq is the use of a form of a front seal 1 equipped with a switching-over element 11, such that:

pulling from the outside an obstacle (19/190) that is wedged (FIGS. 8, 11) creates a force F3 on the switching-over element mainly along its principal axis 45a, which therefore becomes its activation axis (arrow 14b in FIG. 8), and pulling the same wedged obstacle from inside creates a force F4 on the switching-over element 11 mainly on its lateral wall (arrow 14a, FIG. 9); the axis then no longer allows switching over.

Figure 8:
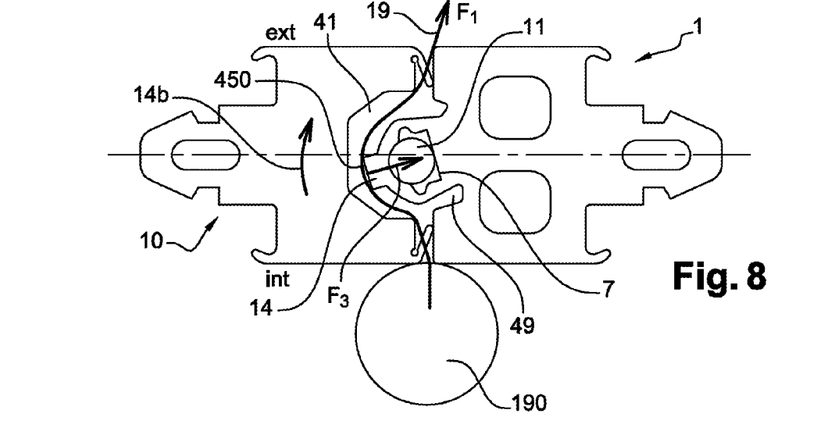
Figure 9:
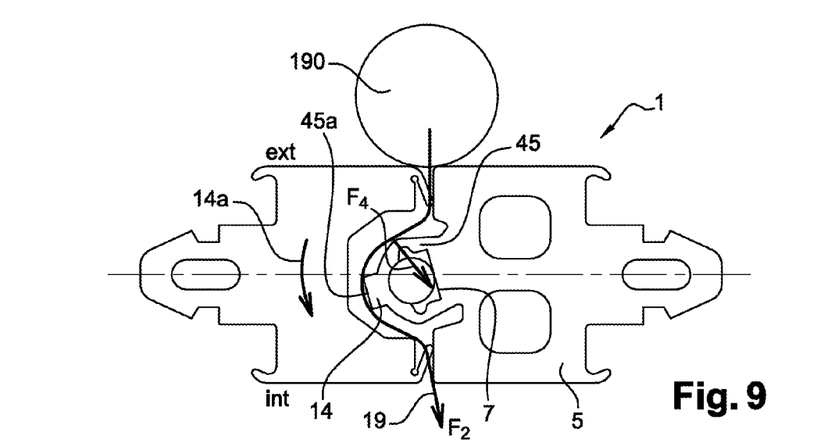
Figure 10:
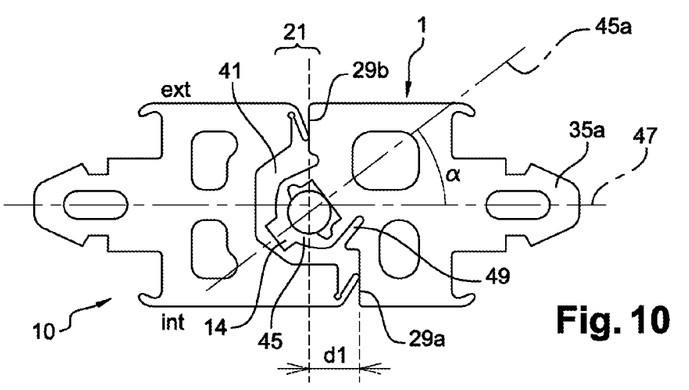
Figure 11:
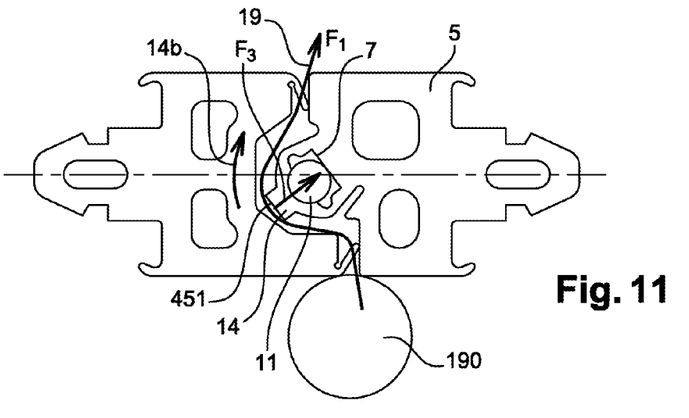
Figure 12:
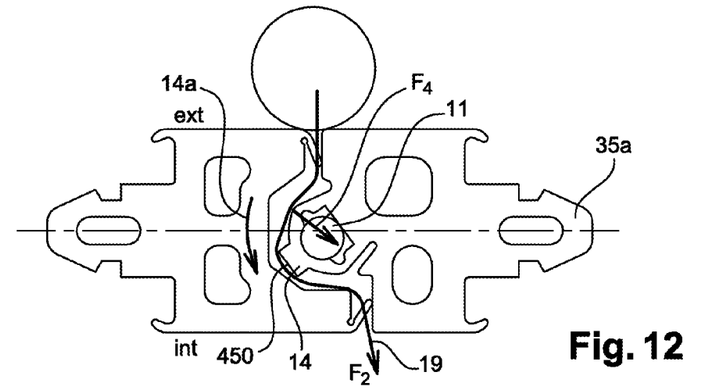

FIGS. 10-12, the angle alpha between 45a and 47 is more marked than in the solution in FIGS. 7-9.

And the lateral surfaces 29a, 29b, perpendicular to the axis 47, are offset by a distance dl along this axis, with respect to each other (cf. FIG. 10), so that the external lateral wall of the seal is shorter on the inside than on the outside, and therefore the protrusion projects more therein with respect to the rest of the body 5, which:

accentuates the tendency to activation tilting (direction 14b) if 19 is pulled on on the outside (FIG. 11), all the more so with the easing slot 49 situated between 45 and 29a, and makes tilting in the opposite direction more difficult (FIG. 12, direction 14a).

Figure 13:
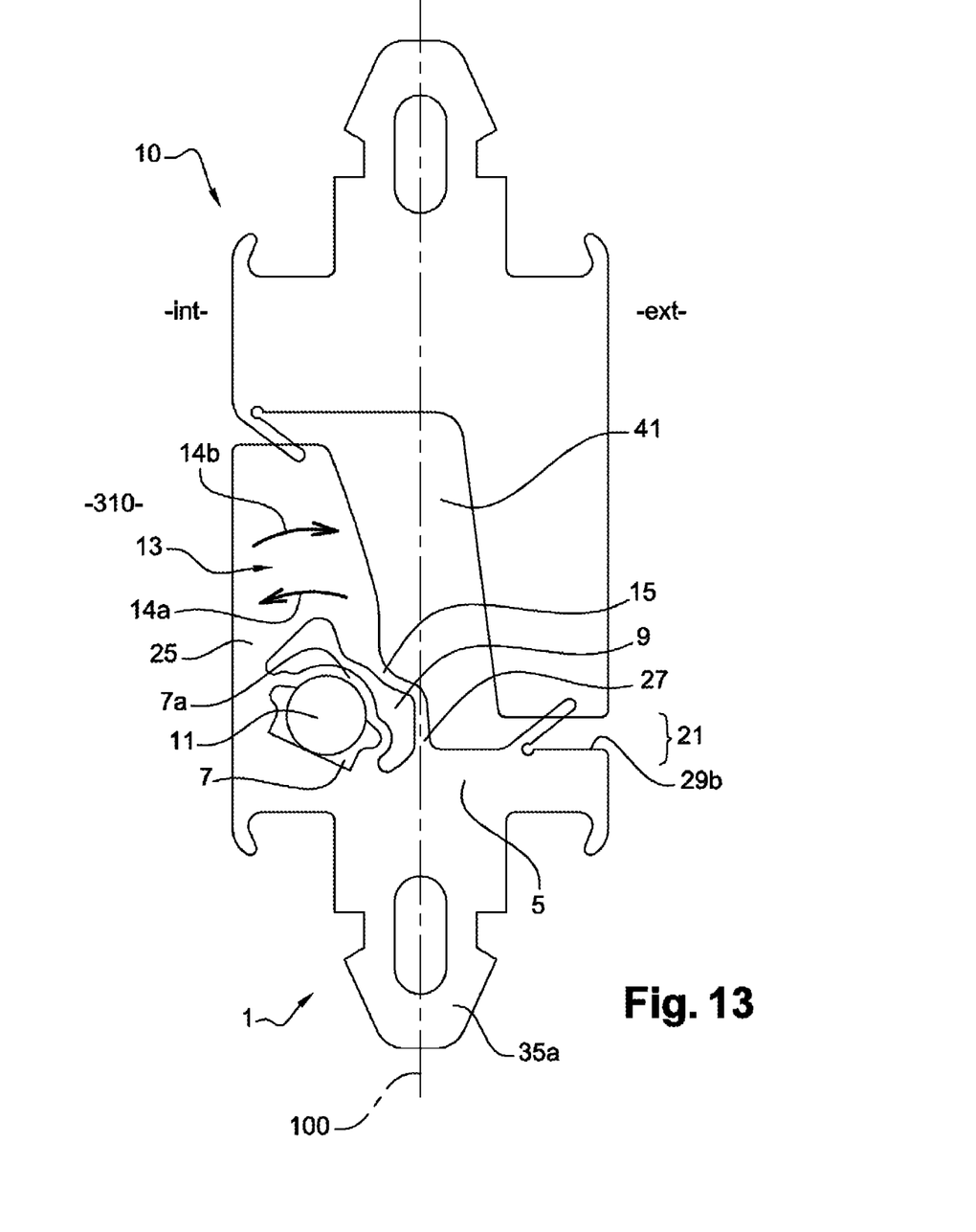

FIG. 13 illustrates a variant where, as referenced and illustrated, many of the features of the solution in FIGS. 1 to 6 are found again.

Thus, on the male seal 1 illustrated, there are: the seal body 5 integrating the chamber 7, the wall 7a that projects in the space 9, the switching-over element 11, the actuation lever 13 (direction 14a, 14b), the optional strip 27, the female seal 10 with its hollow 41, the connecting pieces for fixing said seals 1, 10 (including the connecting piece 35), the inter-seal slot 21 and the hinge strip 25 situated alongside the chamber 7.

It should be noted that, in this variant, only one of the two lateral bearing surfaces remains, namely 29b, on the outside.

This lateral bearing surface 29b will preferably be situated level with the switching-over element 11, alongside chamber 7, lower than the hinge strip 25 situated on the opposite side.

Thus the inter-seal slot 21 (and therefore the form of the element 19 passing therein) will here substantially be in an "S", to be compared with the substantially omega shape of the version in FIGS. 1-6

The invention claimed is:

1. A set of seals comprising:

a front male seal for a door, the front male seal comprising:

a seal body comprising a chamber delimited by a wall projecting into a space;

a switching-over element arranged in the chamber and actuated by deformation of the chamber; and a lever for actuating the switching-over element, the lever tilting with respect to the body including the chamber in a first direction and a second direction, and the lever including:

on a side facing the space, a surface pressing directly on the wall of the chamber during tilting, and on an opposite side, a protuberance which, under a force exerted by an external activation element, tilts the lever, wherein the lever is arranged so that tilting of the lever in the first direction, does not deform the chamber to actuate the switching-over element, and tilting of the lever in the second direction, deforms the chamber to actuate the switching-over element and a front female seal having a hollow arranged to receive the lever of the front male seal and where the lever is able to move in the first direction or the second direction.

2. The set of seals according to claim 1, wherein the lever is mounted to tilt with respect to the seal body through a hinge strip situated alongside the chamber.

3. The set of seals according to claim 1, wherein, opposite an articulation of the lever on the seal body, the lever is connected to the seal body by a strip of material so that the space where the wall of the chamber projects is closed.

4. The set of seals according to claim 1, wherein the front male seal further comprises:
- a principal axis that passes through the lever, the chamber, and the switching-over element,
- two lateral bearing surfaces situated respectively on either side of the principal axis, wherein the external activation element passes along at least one of the lateral bearing surfaces, the external activation element is configured to exert a force on the lever such that the lever moves in the first direction or in the second direction.

5. The set of seals according to claim 4, wherein
- the seal body of the front male seal has a solid portion situated between an articulation of the lever on the seal body and the lateral bearing surface situated closest to the articulation, and
- the solid portion is devoid of any chamber able to be deformed by the lever when the lever tilts in the first direction.

6. A door for a passenger compartment of a vehicle, the passenger compartment having an inside where passengers are received in the passenger compartment and an outside, wherein the door:

moves between an open position and a closed position to respectively allow and prevent access beyond the door to the inside and to the outside of the passenger compartment, is provided with the front male seal according to claim 1 and, has an edge along which the front male seal extends which, in the closed position, engages in the hollow of the front female seal where the lever is able to move in the first direction or the second direction.

7. The door according to claim 6 wherein the lever is mounted to be able to tilt with respect to the seal body in a zone situated closer to the inside of the passenger compartment than a surface of the lever that presses on the wall of the chamber, so that the external activation element, held on the inside and pulled on from the outside after having passed between the lever and a bottom of the hollow, causes the lever to tilt toward the switching-over element.

8. A vehicle comprising:
- a body surrounding a passenger compartment having an inside where passengers are received in the passenger compartment and an outside, the body having at least one opening allowing access to the passenger compartment and leaving therefrom, and
- a door able to move between respectively open and closed positions and which, respectively, allow and prevent passage through the opening,
- the body and the door comprising respective edges facing each other,
- the front male seal according to claim 1 being fixed along the body edge while the front female seal is fixed along the door edge, the front female seal having the hollow which receives at least the lever of the front male seal in the closed position of the door and where the lever is able to move in the first direction or the second direction.

* * * * *